US007738495B2

(12) United States Patent
Dalal et al.

(10) Patent No.: US 7,738,495 B2
(45) Date of Patent: Jun. 15, 2010

(54) METHOD OF DETERMINING A MAXIMUM TRANSMISSION UNIT VALUE OF A NETWORK PATH USING TRANSPORT LAYER FEEDBACK

(75) Inventors: Mitesh Dalal, Santa Clara, CA (US); Randall R. Stewart, Chapin, SC (US); Amol R. Khare, Sunnyvale, CA (US); Vineet Dixit, Mountain View, CA (US); Srinivas Subramanian, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1012 days.

(21) Appl. No.: 11/338,591

(22) Filed: Jan. 23, 2006

(65) Prior Publication Data
US 2007/0171828 A1     Jul. 26, 2007

(51) Int. Cl.
*H04J 3/24* (2006.01)
(52) U.S. Cl. .................................. 370/476; 370/300
(58) Field of Classification Search ................ 370/241, 370/250, 252, 224, 300, 395, 395.5, 467, 370/474, 476; 709/238, 224, 232, 235; 714/746, 714/748, 749
See application file for complete search history.

(56) References Cited

U.S. PATENT DOCUMENTS

| 6,034,958 | A * | 3/2000 | Wicklund | 370/395.32 |
|---|---|---|---|---|
| 6,347,337 | B1 * | 2/2002 | Shah et al. | 709/224 |
| 2001/0033554 | A1 * | 10/2001 | Ayyagari et al. | 370/328 |
| 2002/0075900 | A1 * | 6/2002 | Turina et al. | 370/467 |
| 2003/0187975 | A1 * | 10/2003 | Brown et al. | 709/224 |
| 2004/0001444 | A1 * | 1/2004 | Sadot et al. | 370/252 |
| 2004/0218550 | A1 * | 11/2004 | Kim | 370/254 |
| 2005/0005024 | A1 * | 1/2005 | Samuels et al. | 709/238 |
| 2005/0022089 | A1 * | 1/2005 | Le et al. | 714/749 |
| 2005/0157726 | A1 * | 7/2005 | Vesterinen | 370/395.5 |
| 2005/0281288 | A1 * | 12/2005 | Banerjee et al. | 370/477 |
| 2006/0114931 | A1 * | 6/2006 | Miyata | 370/466 |

(Continued)

OTHER PUBLICATIONS

The Cable Guy, "Path Maximum Transmission Unit (PMTU) Black Hole Routers," Jul. 2004, retrieved from the internet: < URL: http://www.microsoft.com/technet/community/columns/cableguy/cg...>, retrieved on May 5, 2006. (3 pages).

(Continued)

*Primary Examiner*—Kwang B Yao
*Assistant Examiner*—Andrew Lai
(74) *Attorney, Agent, or Firm*—Hickman Palermo Truong & Becker LLP (57) ABSTRACT

A network element implementing a method for determining an optimal maximum transmission unit (MTU) value on a path between two nodes in a network is described. A sending node interested in learning the optimal MTU path value allows fragmentation of datagrams sent on the path, selects an initial MTU, and sends one or more data packets to a receiving node. Upon receiving the data the receiver determines if fragmentation occurred. If no fragmentation occurred then the MTU path selected is the optimal MTU for the given path between the nodes. If fragmentation did occur then the sender is notified that the selected MTU was not the optimal MTU for the path. Either the receiver proposes a new MTU for the path, or the sender selects a new, smaller MTU. The process repeats until the receiver detects no fragmentation.

29 Claims, 6 Drawing Sheets

U.S. PATENT DOCUMENTS

2007/0115963 A1* 5/2007 Vadlakonda et al. ........ 370/389

OTHER PUBLICATIONS

J. Postel, "The TCP Maximum Segment Size and Related Topics," retrieved from the internet: < URL: http://www.csl.sony.co.jp/cgi-bin/hyperrfc?rfc879.txt>, retrieved on May 5, 2006. (10 pages).

The TCP/IP Guide, "IP Datagram Size, the Maximum Transmission United (MTU), and Fragmentation Overview," retrieved from the internet: < URL: http://www.tcpipguide.com/free/t_IPDatagramSizetheMaximumTra...>, retrieved on May 5, 2006. (3 pages).

Mac OS Xhints, "A script to determine Maximum Transmission United," retrieved from the internet: < URL: http://www.macosxhints.com/article.php?story=20060201155734147>, retrieved on May 5, 2006. (4 pages).

Cisco Systems, Inc., "Understanding Maximum Transmission Unit (MTU) on ATM Interfaces," retrieved from the internet: < URL: http://www.cisco.com/warp/public/121/mtu_atm.html>, retrieved on May 5, 2006. (8 pages).

* cited by examiner

FIG. 2

| Plateau | MTU | Comments | Reference |
|---|---|---|---|
| | 65535 | Official maximum MTU | RFC 791 |
| | 65535 | Hyperchannel | RFC 1044 |
| 65535 | | | |
| 32000 | | Just in case | |
| | 17914 | 16Mb IBM Token Ring | |
| 17914 | | | |
| | 8166 | IEEE 802.4 | RFC 1042 |
| | 4352 | RDDI (Revised) | RFC 1188 |
| 4352 (1%) | | | |
| | 2048 | Wideband Network | RFC 907 |
| | 2002 | IEEE 802.5 (4Mb recommended) | RFC 1042 |
| 2002 (2%) | | | |
| | 1536 | Exp. Ethernet Nets | RFC 895 |
| | 1500 | Ethernet Networks | RFC 894 |
| | 1500 | Point-to-Point (default) | RFC 1134 |
| | 1492 | IEEE 802.3 | RFC 1042 |
| 1492 (3%) | | | |
| | 1006 | SLIP | RFC 1055 |
| | 1006 | ARPANET | BBN 1822 |
| 1006 | | | |
| | 576 | X. 25 Networks | RFC 877 |
| | 544 | DEC IP Portal | |
| | 512 | NETBIOS | RFC 1088 |
| | 508 | IEEE 802/Source-Rt Bridge | RFC 1042 |
| | 508 | ARCNET | RFC 1051 |
| 508 | | | |
| | 296 | Point-to-Point (low delay) | RFC 1144 |
| 296 | | | |
| 68 | | Official minimum MTU | RF 791 |

METHOD OF DETERMINING A MAXIMUM TRANSMISSION UNIT VALUE OF A NETWORK PATH USING TRANSPORT LAYER FEEDBACK

FIELD OF THE INVENTION

The present invention generally relates to a method for discovery of path MTU (Maximum Transmission Unit) values for transport layer protocol connections using end-to-end feedback.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

1. Stream Control Transmission Protocol

SCTP is a general-purpose transport protocol for message-oriented applications that was designed by the Internet Engineering Task Force (IETF) SIGTRAN working group, which released the SCTP standard draft document in IETF Request for Comments (RFC) 2960 in October 2000. SCTP provides support for multi-homed hosts, and can be used as the transport protocol for upper-layer applications that require monitoring and detection of loss of session. The computer system hosts communicating over an SCTP transport connection are usually represented by the so-called SCTP endpoints. An SCTP endpoint is the logical sender/receiver of SCTP packets. An SCTP endpoint is associated with one or more transport addresses, and each transport address is defined by a Network Layer address, a Transport Layer protocol and a Transport Layer port number. For example, in the case of SCTP running over IP, a transport address is defined by the combination of an IP address and an SCTP port number (where SCTP is the Transport Layer protocol). According to the standard SCTP specification, each message containing user data and sent from one SCTP endpoint to another must be acknowledged by the receiving SCTP endpoint.

An SCTP association is a protocol relationship between SCTP endpoints, and is composed of the two SCTP endpoints and the protocol state information. The protocol state information includes, among other parameters, one or more verification tags, a set of transmission sequence numbers, and a set of stream sequence numbers. An SCTP association can be uniquely identified by the transport addresses used by the endpoints in the association. Two SCTP endpoints cannot have more than one SCTP association between them at any given time.

The data units transported over an SCTP transport connection are referred to as SCTP packets. If SCTP runs over Internet Protocol (IP), an SCTP packet forms the payload of an IP packet. An SCTP packet is composed of a common header and one or more chunks. The common header contains fields for a source port number, a destination port number, a verification tag, and a checksum. The source port numbers and the destination port numbers are used for the identification of an SCTP association. SCTP uses the same port concept used by Transmission Control Protocol (TCP) and the User Datagram Protocol (UDP). The verification tag is a randomly generated value that is SCTP association-specific, and is exchanged between the SCTP endpoints at the SCTP association startup. The verification tag serves as a key that allows a receiver to verify that the SCTP packet belongs to the current SCTP association. The checksum is used for the detection of transmission errors.

A chunk is a unit of information within an SCTP packet, consisting of a chunk header and chunk-specific content. A chunk header includes a chunk type field, used to distinguish upper-layer application data chunks and different types of control chunks, chunk flag field for chunk specific flags, and a chunk length field. The chunk-specific content occupies the rest of the chunk, and is represented as a value field that contains the actual payload of the chunk. A Transmission Sequence Number (TSN) is attached to each chunk containing upper-layer application data to permit the receiving SCTP endpoint to acknowledge the receipt of the chunk and to detect duplicate deliveries. The TSN is a 32-bit sequence number maintained internally by the SCTP stack.

SCTP supports different streams of messages within one SCTP association. A message is a unit of data in a chunk sent by an upper-layer application over the SCTP association from one SCTP endpoint to another. A stream is a unidirectional logical channel established from one SCTP endpoint to another associated SCTP endpoint, within which all data messages are delivered in sequence unless out-of-order delivery is requested by the upper-layer application. A 16-bit sequence number, called the Stream Sequence Number (SSN), is associated with each stream, and is maintained internally by the SCTP stack to ensure sequenced delivery of the data messages within a given stream to the upper-layer application. One SSN is attached to each data message sent or received by the upper-layer application.

2. Path MTU Discovery

A Path Maximum Transmission Unit (PMTU) value is the maximum number of bytes of an IP datagram that can be transferred in a single unit over a specific path in an IP network. The PMTU for a particular path may vary widely as a result of congestion or other network conditions. If an IP datagram exceeds the MTU, normally it is either fragmented into smaller pieces by the network en route to its destination or dropped by the network.

Path MTU discovery (PMTUD) is a method used to intelligently discover the path maximum transmission unit (MTU) for a particular connection. The most common technique for PMTUD is described in RFC 1191. The objective is to find the MTU value for a path so that IP datagrams can be delivered without fragmentation. PMTUD is a mandatory function of SCTP that makes SCTP more adaptive to various network conditions. In SCTP the PMTU value is dynamic; changes within the routing infrastructure of the network can lead to a different path through the network, and thus to a different value for PMTU.

A common approach to implement PMTUD involves configuring hosts to mark outbound IP datagrams with a "Don't Fragment" (DF) bit in the IP header which directs routers along the path not to fragment an IP packet. For example, when a router receives a 1,500-byte IP datagram in which the DF bit is set to 1, and the route of choice is over a link having a PMTU of 512, the router cannot forward the IP datagram. Instead, the router returns to the sender an ICMP message coded to indicate that the destination is unreachable due to the need to fragment. (See RFC 1191.)

To handle the ICMP message, the SCTP sender may either reduce the size of datagrams it is sending along the path, or cease setting the DF bit in the headers of those datagrams. Clearly, the former strategy may continue to elicit ICMP messages for a while, whereas ceasing to set the DF bit authorizes the IP layer along the path to perform IP fragmentation on the datagram whenever it becomes necessary. However, fragmentation is undesirable for many reasons.

ICMP messages are unreliable, and due to the security risk they pose, ICMP is not widely enabled on routers that are coupled to the public Internet. In fact, routers of many enterprises drop all ICMP messages. This seriously hinders operation of the PMTU algorithm, resulting in upstream routers settling for a sub-optimal MTU. Additionally, the result of setting the DF bit in all IP datagrams results in numerous dropped packets, and as a result seriously affects throughput. A new technique is needed that does not involve ICMP messaging or participation from intermediary routers.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method for determining an MTU value for a path in a network over a transport layer protocol connection using end-to-end feedback is described. In the following description, for the purpose of explanation, numerous specific details are set forth in order to provide a thorough understanding of the present invention. It will be apparent, however, to one skilled in the art that the present invention may be practiced without these specific details. In other instances, well-known structures and devices depicted in block diagram form in order to avoid unnecessarily obscuring the present invention.

Embodiments are described herein according to the following outline:

1.0 General Overview
2.0 Structural and Functional Overview
3.0 Example SCTP Implementation Of Method Of Determining A Maximum Transmission Unit Value Of A Network Path Using Transport Layer Feedback
   3.1 General Process
   3.2 Binary Search
   3.3 Determining Path MTU In Response To Network Changes
4.0 Implementation Mechanisms-Hardware Overview
5.0 Extensions and Alternatives
1.0 General Overview The needs identified in the foregoing Background, and other needs and objects that will become apparent for the following description, are achieved in the present invention, which comprises, in one aspect, a method of determining a maximum transmission unit (MTU) value on a path between a first network node and a second network node comprising (a) allowing data packets on the path to be fragmented; (b) sending one or more datagrams from the first node to the second node along a network path based on a first MTU value; (c) determining if fragmentation of the one or more datagrams along the network path occurred; (d) if fragmentation of the one or more IP datagrams occurred, then performing: sending one or more notifications indicating that fragmentation occurred; selecting a new MTU value; and repeating steps (b) to (d) using the new MTU value one or more times until determining that no fragmentation occurred.

In one feature of this aspect, allowing data packets to be fragmented comprises setting a flag in a header of the one or more datagrams that instructs the network nodes to allow fragmentation of the datagram. In another feature, the first MTU value is selected from a list of available MTU values based on an interface associated with the path. In yet another feature, the list of MTU values is a table of MTU interface plateaus.

In still another feature, if no fragmentation occurred, then the first MTU value is determined as an optimal MTU for the network path. In a further feature, the first node and the second node negotiate MTU discovery compatibility. In another feature, the new MTU is determined by obtaining a received MTU value that is placed in the notification message by the second node. In yet another feature, the new MTU is determined based on a binary search of a list of MTU values.

In one feature, steps (a) through (d) are performed in response to a change in network path characteristics. In another feature, steps (a) through (d) are performed at periodic intervals to determine if the network path can support an increased MTU value.

According to another aspect, the invention provides a machine-readable tangible storage medium carrying one or more sequences of instructions for determining a maximum transmission unit (MTU) value on a path between a first network node and a second network node, wherein execution of the one or more sequences of instructions by one or more processors causes: (a) allowing data packets on the path to be fragmented; (b) sending one or more datagrams from the first node to the second node along a network path based on a first MTU value; (c) determining if fragmentation of the one or more datagrams along the network path occurred; (d) if fragmentation of the one or more IP datagrams occurred, then performing: sending one or more notification messages indicating that fragmentation occurred; selecting a new MTU value; and repeating steps (b) to (d) using the new MTU value one or more times until determining that no fragmentation occurred.

In yet another aspect, the invention provides a data packet router apparatus, comprising one or more processors; one or more network interfaces that communicatively couple the one or more processors to a telecommunications network; a machine-readable tangible storage medium carrying one or more sequences of instructions for determining a maximum transmission unit (MTU) value on a path between the apparatus and a second network node, wherein execution of the one or more sequences of instructions by the one or more processors causes the one or more processors to perform: allowing data packets on the path to be fragmented; sending one or more datagrams to the second node along a network path based on a first MTU value; receiving zero or more notification messages indicating that fragmentation of the one or more datagrams along the network path occurred; when one or more of said notification messages are received, selecting a new MTU value; and repeating the sending, receiving and selecting using the new MTU value one or more times until no notification messages are received.

In one feature of this aspect, allowing data packets to be fragmented comprises setting a flag in a header of the one or more datagrams that instructs one or more downstream nodes to allow fragmentation of the datagram. In another feature, the first MTU value is selected from a list of available MTU values based on an interface associated with the path. In yet another feature, the list of MTU values is a table of MTU interface plateaus. In still another feature, if no notification messages are received, then the first MTU value is determined as an optimal MTU for the network path.

In still another feature, the apparatus and the second node negotiate MTU discovery compatibility. In another feature, the new MTU is determined by obtaining a received MTU value that is placed in one of the notification messages by the second node. In yet another feature, the new MTU is determined based on a binary search of a list of MTU values. In still another feature, the sending, receiving and selecting are performed in response to a change in network path characteristics. Alternatively, the sending, receiving and selecting are performed periodically to determine if the network path can support an increased MTU value.

In another aspect, the invention provides a data packet router apparatus, comprising: one or more processors; one or more network interfaces that communicatively couple the one or more processors to a telecommunications network; a machine-readable tangible storage medium carrying one or more sequences of instructions for determining a maximum transmission unit (MTU) value on a path between the apparatus and a sending network node, wherein execution of the one or more sequences of instructions by the one or more processors causes the one or more processors to perform: allowing data packets on the path to be fragmented; receiving one or more datagrams from the sending node along a network path based on a first MTU value; determining whether fragmentation of the one or more datagrams occurred along the network path, and if so, generating and sending back to the sending node, zero or more notification messages indicating that fragmentation of the one or more datagrams along the network path occurred; receiving one or more further datagrams from the sending node along the network path based on a new MTU value that the sending node selected; and repeating the receiving, determining, generating and sending, and receiving one or more times until no fragmentation is determined.

In one feature of this aspect, allowing data packets to be fragmented comprises receiving a flag in a header of the one or more datagrams that instructs the apparatus to allow fragmentation of the datagram. In another feature, the apparatus and the sending node negotiate MTU discovery compatibility. In yet another feature, the apparatus provides the new MTU to the sending node in one of the notification messages. In still another feature, the receiving, determining, generating and sending, and receiving are performed in response to a change in network path characteristics. In a further feature, the receiving, determining, generating and sending, and receiving are performed periodically to determine if the network path can support an increased MTU value.

An effective discovery of MTU on a given path to a SCTP peer using the approaches herein can give drastic improvements in performance. Finding an optimal MTU results in eliminating the need for fragmentation and reassembly of IP datagrams which is otherwise required if the MTU used for the given SCTP association exceeds what is supported on the path or by increasing the MTU if the association is using a sub-optimal MTU value.

In one embodiment a MTU value is determined for an SCTP association that is being established for the first time. In another embodiment, a new MTU value is discovered for a current SCTP association after the MTU path characteristics have changed.

In either embodiment two SCTP endpoints can find an optimal MTU by determining a MTU value along a path that does not result in fragmentation of IP datagrams. In such embodiments the SCTP sender either discovers the MTU from a value conveyed in a message sent back by the SCTP receiver, or alternatively discovers the MTU by adopting different MTU values using a binary search until the receiver SCTP reports no fragmentation.

2.0 Structural and Functional Overview

Figure 4:
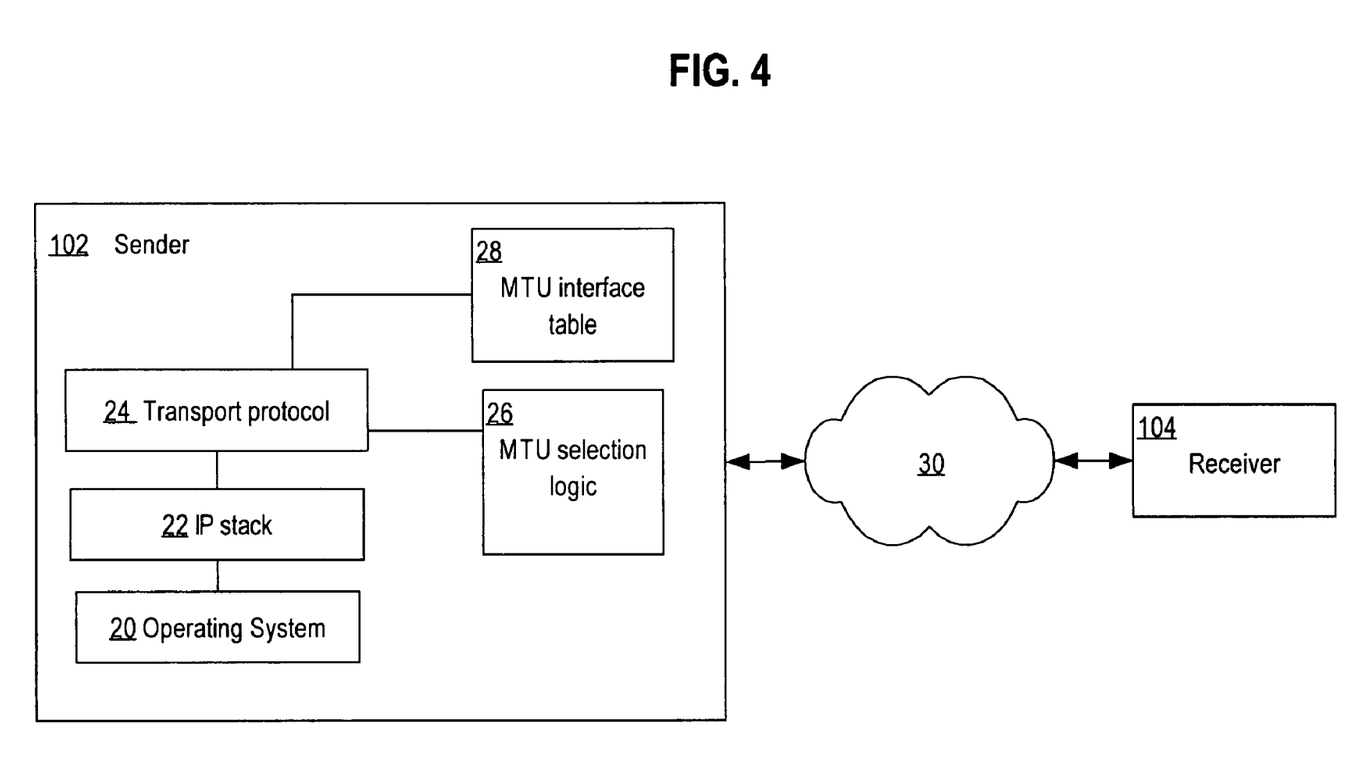
FIG. 4 is a block diagram illustrating a logical architecture that may be used in an embodiment.

FIG. 4 is a block diagram illustrating a logical architecture that may be used in an embodiment.

A sender 102 is communicatively coupled through a network 30 to a receiver 104. In an embodiment, sender 102 and receiver 104 are nodes in a packet-switched network, such as routers, switches, etc. Sender 102 comprises an operating system 20 that hosts or includes an IP stack 22 that in turn communicates with a transport protocol 24. In an embodiment, transport protocol 24 implements SCTP.

The transport protocol 24 communicates with an MTU interface table 28 and MTU selection logic 26. In one embodiment, MTU selection logic 26 implements the functions described herein to determine an optimal MTU value for a path between the sender 102 and the receiver 104. MTU interface table 28 comprises a table, mapping or list that associates device interface type identifiers with MTU values and plateau values. MTU interface table 28 may be implemented using any appropriate data structure that can associate two or more values. For example, MTU interface table 28 may be a MIB table or database.

Receiver 104 similarly comprises an operating system, IP stack, transport protocol, and MTU selection logic.

Figure 1A:
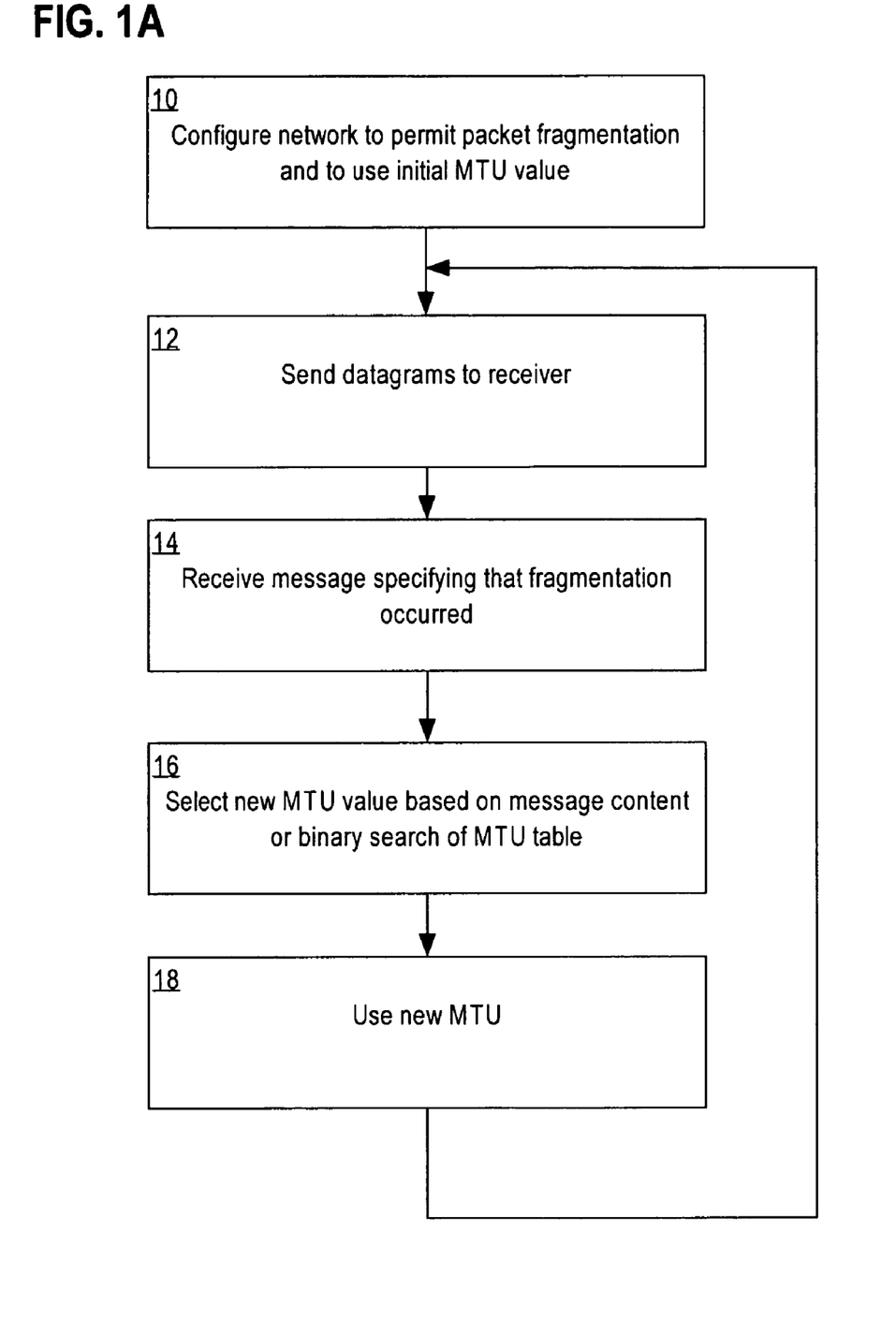
FIG. 1A is a flow diagram illustrating a high level overview of a method of determining an MTU for a path.

FIG. 1A is a block diagram illustrating a high level overview of a method of determining an MTU for a path. To illustrate a clear example, FIG. 1A is described herein with reference to FIG. 4. However, other embodiments of the broad approach of FIG. 1A may be performed in many other network contexts.

In step 10, a network is configured to permit fragmentation of packets traversing among nodes of the network, and to use an initial MTU value. After the configuration of step 10 is performed, intermediate routers and other network nodes are allowed to perform fragmentation of IP datagrams directed from sender 102 to receiver 104, if necessary. In an embodiment, the initial MTU value is selected from an entry of an MTU table stored at the sender. The entry is mapped to an interface with which datagrams will be sent from the sender to the receiver. Thus, depending on what kind of interface is used, the sender selects a different initial MTU value as specified in the table.

In step 12, one or more datagrams are sent. For example, sender 102 sends a plurality of IP datagrams to receiver 104. The initial MTU value is used to determine the maximum size of the datagrams. When the receiver receives the IP datagrams, two possible outcomes can occur. The first is that no fragmentation occurred, and the initial MTU value is the optimal path MTU since there was no fragmentation. The second outcome is that fragmentation occurred on the path, and therefore the SCTP sender has not yet discovered the optional path MTU since there was fragmentation along the path. If the datagram was a MTU sized data segment and the receiving SCTP endpoint did not detect any fragmentation, then all routers on the path to the receiving SCTP endpoint supported the chosen MTU. However, if the receiving SCTP endpoint detected fragmentation, then the MTU path was not supported and some intermediate router had an MTU smaller than the selected MTU.

In step 14, a message specifying that fragmentation occurred is received. In one embodiment that uses SCTP, an SCTP message comprising a fragmentation chunk is received. The fragmentation chunk signals that fragmentation occurred between the sender and the receiver, and optionally may specify a new proposed MTU value.

In step 16, a new MTU value is selected based on an MTU value in the received message specifying that fragmentation occurred, or based on a binary search of the MTU table.

In step 18, one or more subsequent datagrams are sent using the new MTU. The process repeats, as indicated by the loopback arrow in FIG. 1A, until an optimal MTU is selected with which no fragmentation message is received.

Using this approach, a sender can rapidly determine an optimal MTU for a path, without using ICMP messages, based on end-to-end path fragmentation feedback information from the receiver. In an embodiment, information about fragmentation learned by the receiving transport stack is sent back to the sending SCTP endpoint so that the sending endpoint can adjust the MTU that the sending endpoint is currently using. The information is sent back to the sending SCTP endpoint in the form of an SCTP chunk termed a fragmentation chunk.

The fragmentation feedback in the approach herein is reliable. To provide reliability the SCTP receiver sends the fragmentation chunk repeatedly until the SCTP receiver an acknowledgment from the SCTP sender that received the fragmentation chunk. This approach ensures that the fragmentation information is reliably communicated and processed at the SCTP receiver and that effective action has been taken to reduce the MTU and hence avoid fragmentation in future packets.

Figure 1B:
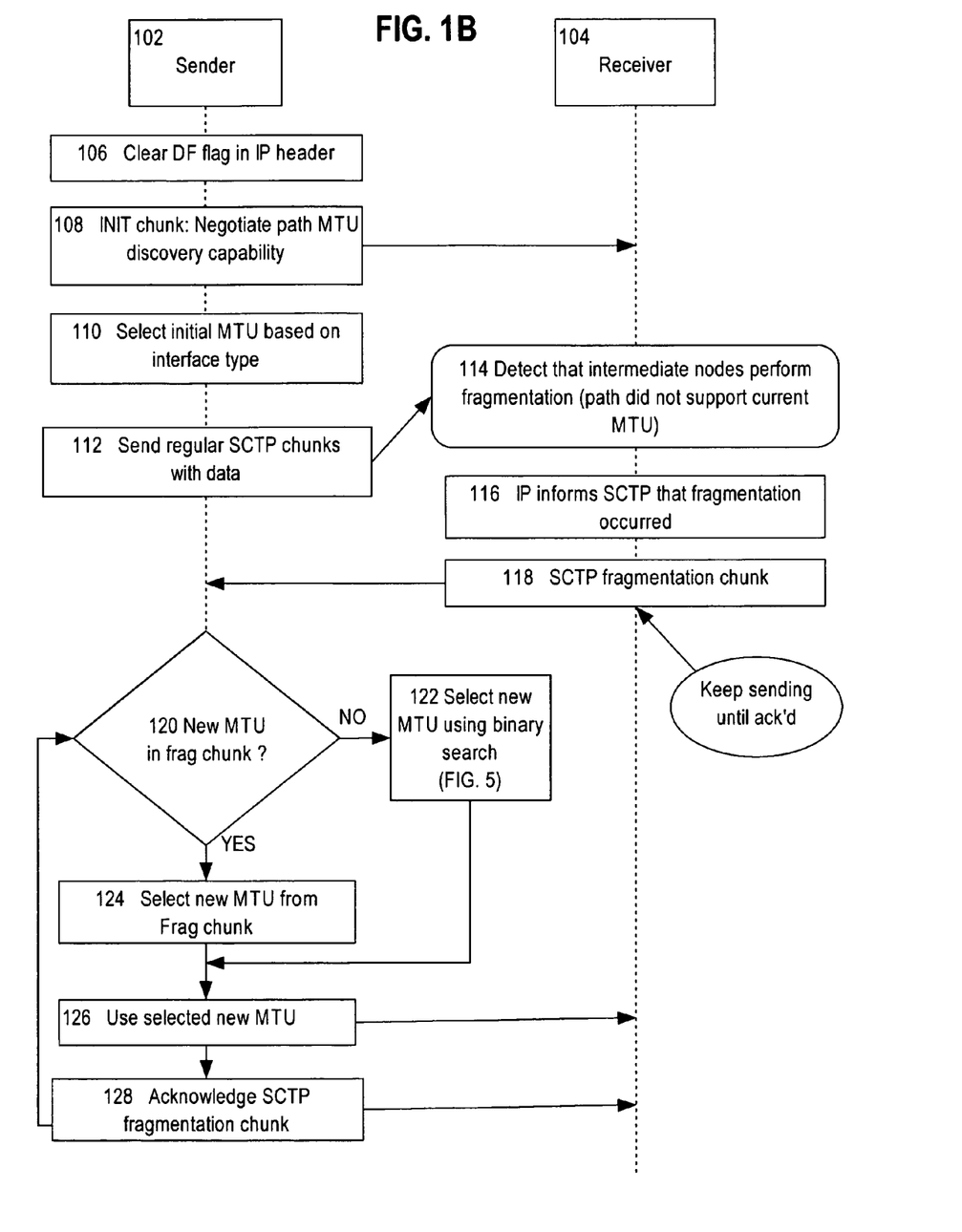
FIG. 1B is a flow diagram that illustrates a process of determining MTU for two SCTP endpoints using end-to-end feedback.
Figure 2:
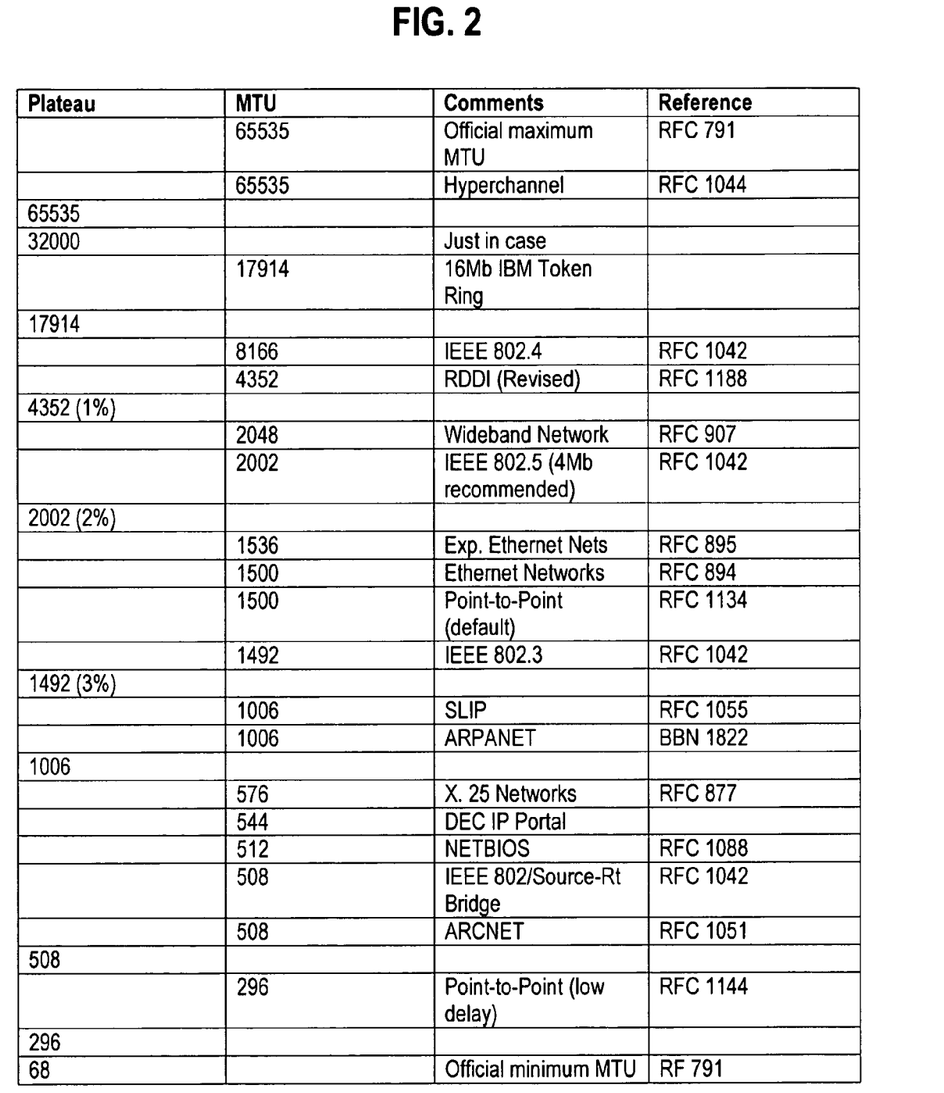
FIG. 2 is an example of an MTU interface table that be used in one embodiment.

3.0 Example SCTP Implementation of Method of Determining a Maximum Transmission Unit Value of a Network Path Using Transport Layer FeedBack 3.1 General Process FIG. 1B is a flow diagram that illustrates a process of determining MTU for two SCTP endpoints using end-to-end feedback; FIG. 2 is an example of an MTU interface table that be used in one embodiment; FIG. 4 is a block diagram illustrating a logical architecture that may be used in an embodiment. For purposes of illustrating a clear example, FIG. 1B is described herein with reference to FIG. 2 and FIG. 4. However, the approach of FIG. 1B can be practiced in other embodiments and contexts.

Referring first to FIG. 1B, sender 102 and receiver 104 both are SCTP endpoints; the sender manages data that the receiver consumes. In step 106, sender 102 permits fragmentation in the network by clearing the DF flag in the IP header of datagrams that the sender sends. For example, MTU selection logic 26 instructs IP stack 22 not to set the DF flag in any packet that carries a payload from transport protocol 24. As a result, downstream network nodes can fragment packets that the sender sends.

In step 108 an IP datagram carrying an SCTP INIT chunk is sent from the sender 102 to the receiver 104. The sender 102 and receiver 104 perform negotiation to ensure that each endpoint can perform the MTU discovery technique described herein. Further, the sender and receiver establish an SCTP association.

At step 110, sender 102 selects an initial MTU based on the type of interface that the sender is using to send data to receiver 104. In one embodiment, sender 102 hosts or accesses a table that maps MTU values to interface type values.

An example of an MTU interface table is shown in FIG. 2 and comprises a plurality of rows for interface types and columns identified as Plateau, MTU, Comments, and Reference. The Plateau column indicates a topmost or plateau value in bytes for a set of related MTU values, also expressed in bytes. The MTU column stores corresponding MTU values for each plateau. For example, an Ethernet interface has an MTU of 1500 and a plateau of 2002. The Comment column describes an associated interface type. The Reference column, which an embodiment may omit, provides a reference to an IETF RFC that recommends the associated MTU for a given interface type.

Using a table such as FIG. 2, at step 110, if sender 102 has established an association to receiver 104 over an Ethernet interface, then an MTU of 1500 is selected based on the $14^{th}$ row of FIG. 2. If sender 102 is using an IEEE 802.5 interface then an MTU of 2002 is selected.

In an embodiment, it is also possible to find the exact MTU on the path rather than use a MTU plateau value provided in the table of FIG. 2. For example, if an MTU of 1006 caused fragmentation and an MTU of 508 did not, the SCTP endpoint should then try an MTU of 576, which is the highest possible MTU or actual plateau associated with the MTU of 508.

In step 112 the sender 102 begins sending regular SCTP chunks containing data to the receiver 104. At step 114, the receiver determines if one or more intermediate nodes performed any fragmentation. In an embodiment, the IP stack of the receiver detects fragmentation; the IP stack on the receiving SCTP endpoint is responsible for assembling fragments and delivering an assembled packet to the upper layer transport. Fragmentation can be detected through the use of an internal API, in the case of an implementation under Cisco IOS® Software from Cisco Systems, Inc., San Jose, Calif. In an implementation under an operating system such as BSD UNIX, the number of mbufs provides evidence of fragmentation. Alternatively, packets can simply be marked with a flag to indicate fragmentation occurred. Alternatively, the MTU of the path could be determined from the first fragment of the packet and informed to the upper layer, through an internal API in the case of an implementation in Cisco IOS software If fragmentation occurred, then the path from the sender 102 to the receiver 104 did not support the current MTU that was selected by the sender. IP fragmentation standards require that once fragmentation of a datagram occurs, no other routers on the way should reassemble the datagram; therefore, the datagram arrives at the IP stack of the receiver in fragments.

At step 116 the IP stack of the receiver 104 informs an SCTP module of the receiver that fragmentation occurred. In step 118 the receiver 104 creates and sends a SCTP fragmentation chunk to the sender 102, notifying the sender 102 that the path did not support the current MTU. Optionally, the fragmentation chunk includes a new MTU value given by the IP stack of the receiver. Receiver 104 continues to send the fragmentation chunk until the receiver receives an acknowledgment in step 128.

At step 120, the sender receives the fragmentation chunk and determines, based on information in the chunk, whether the receiver specified a new MTU value. If no MTU value is specified in the fragmentation chunk, then in step 122 the sender 102 selects a new MTU using a binary search of the MTU interface table (e.g., FIG. 2). For example, the process of FIG. 5, described below, can be used to perform the binary search.

In step 124 a new MTU value is selected either based on the value received in the chunk or the value obtained from the binary search.

In step 126 the sender 102 uses the new MTU in sending subsequent datagrams to the receiver. In step 128 the sender 102 sends an acknowledge fragmentation chunk to the receiver 104. Steps 112-128 repeat until no fragmentation that occurs for IP datagrams sent between sender 102 and receiver 104.

3.2 Binary Search

Figure 5:
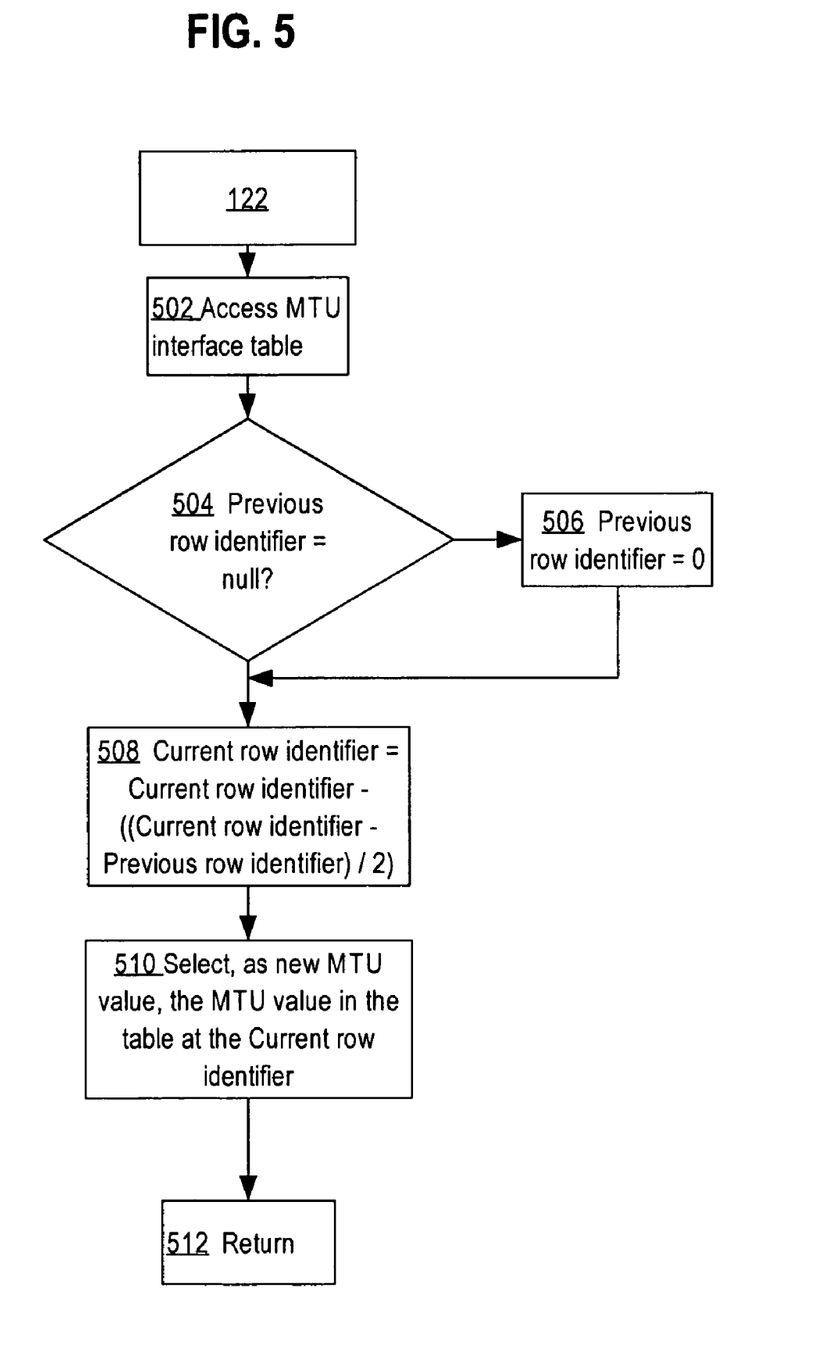
FIG. 5 is a flow diagram of an example binary search process.

FIG. 5 is a flow diagram of an example binary search process. As shown in FIG. 5, an implementation may invoke the process of FIG. 5 at step 122 of FIG. 1B. Generally, FIG. 5 reflects an approach in which a table of MTU values (e.g., FIG. 2) is successively halved until selection of an exact MTU value for a path. For example, if fragmentation occurs with an MTU of 576, then the ideal MTU is somewhere between 576 and the end of the table, or between 576 and a lower MTU that was previously tried, if any.

To implement the binary search, in step 502, the MTU interface table is accessed. For example, sender 102 reads or obtains access to MTU interface table 28 (FIG. 4). In step 504, a test is performed to determine if an identifier of a previous row of the table has a null value. If so, then the previous row identifier is set to zero at step 506. The combination of steps 504, 506 causes the process to use the bottom of the table as a search limit when the process is searching for an alternative to the first MTU that has been tried.

In step 508, a new row identifier is computed by determining a difference of a current row identifier of a current MTU value and a previous row identifier of a previous MTU value, dividing the difference by 2, and subtracting the result from the current row identifier. For example, with the table of FIG. 2, if the current MTU is 1006 and is located at the $20^{th}$ row of the table, and the previously used MTU was 2048 at the $10^{th}$ row, then a new current row identifier is computed as 15 and the corresponding MTU is 1500. The new current row identifier of 15 is halfway between the $10^{th}$ row and the $20^{th}$ row.

The MTU value at the current row identifier determined in step 508 is selected at step 510 and used as the new MTU value. At step 512, control returns, e.g., to the process of FIG. 2. Repetition of the process of FIG. 5 causes the sender to rapidly converge on an ideal MTU by successively trying MTU values that are halfway between a previous MTU value and a new MTU value that caused fragmentation.

3.3 Determining Path MTU in Response to Network Changes

In another embodiment, MTU values are re-evaluated periodically for a path to ensure that the optimal MTU value remains in effect for a path. The MTU for an already established STCP endpoint association may need to decrease over time as a result of network congestion or other problems. It is therefore beneficial to perform a function to account for situations where the path characteristics have changed and require a lower MTU.

Alternatively, path characteristics may improve. To determine if path characteristics have improved, in an embodiment, periodically the MTU is reset to the default MTU for the interface associated with a path, and IP datagrams are sent with that MTU. If fragmentation occurs, then invocation of the binary search causes the sender to rapidly converge on a new optimal MTU given then-current network conditions. In general, the MTU identified in Table 2 for an associated interface always represents the upper limit of possible MTU values for that interface, and the binary search always results in converging downward in the table on an optimal MTU value.

Thus, in one embodiment during periodic intervals the method of MTU discovery disclosed herein is applied to already existing MTU associations to determine if the MTU of the association can be increased. In another embodiment the method herein is applied as a response to a change in a network path characteristic. In either embodiment, the MTU value of the associate can increase or decrease. Alternatively, if fragmentation occurs based on the increased value then the previous MTU value can remain in effect without performing a binary search for a new value.

4.0 Implementation Mechanisms—Hardware Overview

Figure 3:
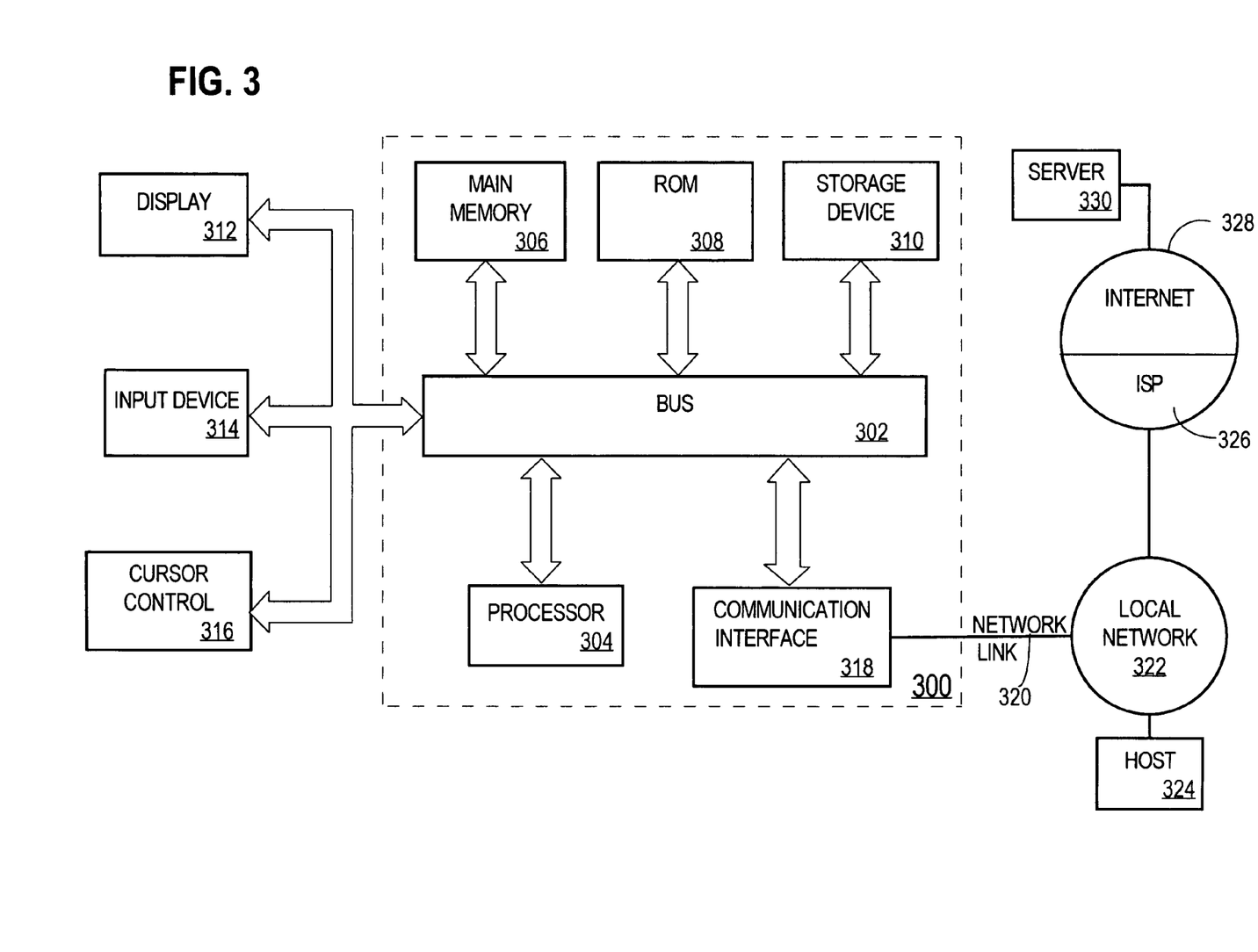
FIG. 3 is a block diagram that illustrates a computer system upon which an embodiment may be implemented.

FIG. 3 is a block diagram that illustrates a computer system 300 upon which an embodiment of the invention may be implemented. The preferred embodiment is implemented using one or more computer programs running on a network element such as a router device. Thus, in this embodiment, the computer system 300 is a router.

Computer system 300 includes a bus 302 or other communication mechanism for communicating information, and a processor 304 coupled with bus 302 for processing information. Computer system 300 also includes a main memory 306, such as a random access memory (RAM), flash memory, or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, flash memory or optical disk, is provided and coupled to bus 302 for storing information and instructions.

A communication interface 318 may be coupled to bus 302 for communicating information and command selections to processor 304. Interface 318 is a conventional serial interface such as an RS-232 or RS-322 interface. Display 312, input device 314, and cursor control 316 are also coupled to bus 302. Firmware or software running in the computer system 300 provides a terminal interface or character-based command interface so that external commands can be given to the computer system.

The term "machine-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Communication interface 318 also provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

Processor 304 may execute the received code as it is received, and/or stored in storage device 310, or other non-volatile storage for later execution. In this manner, computer system 300 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, the approach herein can be used with the TCP protocol. In a TCP approach, a TCP receiver uses TCP options to convey fragmentation signals and proposed MTU values to a TCP sender. The identity of a TCP fragmentation option and its semantics may be ed during the TCP three-way handshake. If fragmentation occurs, then a fragmentation option is sent back to the sender. The fragmentation option is sent until the receiver receives a fragmentation acknowledgment option back from the sender.

What is claimed is:

1. A method of determining a maximum transmission unit (MTU) value on a network path between a first node and a second node comprising:

(a) the first node establishing a Stream Control Transmission Protocol (SCTP) association with the second node;
(b) the first node allowing one or more Internet Protocol (IP) datagrams on the network path to be fragmented, wherein the one or more IP datagrams store as payload first one or more SCTP packets of the SCTP association;
(c) sending the one or more IP datagrams from the first node to the second node along the network path based on a first MTU value;
wherein the second node is the destination of the one or more IP datagrams;
wherein the second node determines if fragmentation of the one or more IP datagrams along the network path occurred;
(d) if the second node determined that fragmentation of the one or more IP datagrams occurred, then performing:
the first node receiving from the second node second one or more SCTP packets over the SCTP association, wherein the second one or more SCTP packets store one or more SCTP chunks which indicate that fragmentation occurred;
the first node selecting a new MTU value; and
repeating steps (b) to (d) using the new MTU value one or more times until determining that no fragmentation occurred;
wherein the method is performed by one or more computing devices.

2. The method of claim 1 wherein allowing the one or more IP datagrams to be fragmented comprises the first node setting a flag in the headers of the one or more IP datagrams that instructs one or more downstream nodes to allow fragmentation of the one or more IP datagrams.

3. The method of claim 1 wherein the first MTU value is selected from a list of available MTU values based on an interface at the first node that is associated with the network path.

4. The method of claim 3 wherein the list of MTU values is a table of MTU interface plateaus.

5. The method of claim 1 wherein if no fragmentation occurred, then the first MTU value is determined as an optimal MTU for the network path.

6. The method of claim 1 wherein the first node and the second node negotiate MTU discovery compatibility.

7. The method of claim 1 wherein the new MTU value is determined by obtaining a received MTU value that is placed in the one or more SCTP chunks by the second node.

8. The method of claim 1 wherein the new MTU value is determined based on a binary search of a list of MTU values.

9. The method of claim 1 wherein steps (b) through (d) are performed in response to a change in network path characteristics.

10. The method of claim 1 wherein steps (b) through (d) are performed at periodic intervals to determine if the network path can support an increased MTU value.

11. A machine-readable tangible non-transitory storage medium storing one or more sequences of instructions for determining a maximum transmission unit (MTU) value on a network path between a first node and a second node, wherein execution of the one or more sequences of instructions by one or more processors causes:

(a) the first node establishing a Stream Control Transmission Protocol (SCTP) association with the second node;
(b) the first node allowing one or more Internet Protocol (IP) datagrams on the network path to be fragmented, wherein the one or more IP datagrams store as payload first one or more SCTP packets of the SCTP association;

(c) sending the one or more IP datagrams from the first node to the second node along the network path based on a first MTU value;

wherein the second node is the destination of the one or more IP datagrams;

wherein the second node determines if fragmentation of the one or more IP datagrams along the network path occurred;

(d) if the second node determined that fragmentation of the one or more IP datagrams occurred, then performing:

the first node receiving from the second node second one or more SCTP packets over the SCTP association, wherein the second one or more SCTP packets store one or more SCTP chunks which indicate that fragmentation occurred;

the first node selecting a new MTU value; and repeating steps (b) to (d) using the new MTU value one or more times until determining that no fragmentation occurred.

12. An apparatus, comprising:

one or more processors;

a machine-readable tangible non-transitory storage medium storing one or more sequences of instructions for determining a maximum transmission unit (MTU) value on a network path between the apparatus and a second node, wherein execution of the one or more sequences of instructions by the one or more processors causes the one or more processors to perform steps comprising:

establishing a Stream Control Transmission Protocol (SCTP) association with the second node;

allowing one or more Internet Protocol (IP) datagrams on the network path to be fragmented, wherein the one or more IP datagrams store as payload first one or more SCTP packets of the SCTP association;

sending the one or more IP datagrams to the second node along the network path based on a first MTU value;

wherein the second node is the destination of the one or more IP datagrams;

wherein the second node determines if fragmentation of the one or more IP datagrams along the network path occurred;

receiving from the second node second one or more SCTP packets over the SCTP association, wherein the second one or more SCTP packets store one or more SCTP chunks which indicate that fragmentation of the one or more IP datagrams along the network path occurred;

when one or more of said SCTP chunks are received, selecting a new MTU value; and repeating the allowing, sending, receiving, and selecting steps using the new MTU value one or more times until no SCTP chunks indicating that fragmentation occurred are received.

13. The apparatus of claim 12 wherein allowing the one or more IP datagrams to be fragmented comprises setting a flag in the headers of the one or more IP datagrams that instructs one or more downstream nodes to allow fragmentation of the one or more IP datagrams.

14. The apparatus of claim 12 wherein the first MTU value is selected from a list of available MTU values based on an interface at the apparatus that is associated with the network path.

15. The apparatus of claim 12 wherein the list of MTU values is a table of MTU interface plateaus.

16. The apparatus of claim 12 wherein if no SCTP chunks indicating that fragmentation occurred are received, then the first MTU value is determined as an optimal MTU for the network path.

17. The apparatus of claim 12 wherein the apparatus and the second node negotiate MTU discovery compatibility.

18. The apparatus of claim 12 wherein the new MTU value is determined by obtaining a received MTU value that is placed, by the second node, in one of the SCTP chunks indicating that fragmentation occurred.

19. The apparatus of claim 12 wherein the new MTU value is determined based on a binary search of a list of MTU values.

20. The apparatus of claim 12 wherein the allowing, sending, receiving, and selecting steps are performed in response to a change in network path characteristics.

21. The apparatus of claim 12 wherein the allowing, sending, receiving, and selecting steps are performed periodically to determine if the network path can support an increased MTU value.

22. An apparatus, comprising:

one or more processors;

a machine-readable tangible non-transitory storage medium storing one or more sequences of instructions for determining a maximum transmission unit (MTU) value on a network path between the apparatus and a sending node, wherein execution of the one or more sequences of instructions by the one or more processors causes the one or more processors to perform steps comprising:

establishing a Stream Control Transmission Protocol (SCTP) association with the sending node;

receiving one or more Internet Protocol (IP) datagrams from the sending node along the network path based on a first MTU value, wherein the one or more IP datagrams store as payload first one or more SCTP packets of the SCTP association;

wherein fragmentation of the one or more IP datagrams along the network path is allowed;

wherein the apparatus is the destination of the one or more IP datagrams;

determining whether fragmentation of the one or more IP datagrams occurred along the network path, and if so, generating and sending back to the sending node second one or more SCTP packets over the SCTP association, wherein the second one or more SCTP packets store one or more SCTP chunks which indicate that fragmentation of the one or more IP datagrams along the network path occurred;

receiving one or more further IP datagrams from the sending node along the network path based on a new MTU value that the sending node selected; and repeating the receiving, determining, generating and sending, and receiving steps one or more times until no fragmentation is determined.

23. The apparatus of claim 22 wherein fragmentation of the one or more IP datagrams along the network path is allowed by a flag in the headers of the one or more IP datagrams that instructs one or more downstream nodes along the network path to allow fragmentation of the one or more IP datagrams.

24. The apparatus of claim 22 wherein the apparatus and the sending node negotiate MTU discovery compatibility.

25. The apparatus of claim 22 wherein the one or more sequences of instructions further comprise instructions the execution of which by the one or more processors causes the one or more processors to perform the step of providing the new MTU value to the sending node by storing the new MTU value in one of the SCTP chunks which indicate that fragmentation occurred.

26. The apparatus of claim 22 wherein the receiving, determining, generating and sending, and receiving steps are performed in response to a change in network path characteristics.

27. The apparatus of claim 22 wherein the receiving, determining, generating and sending, and receiving steps are performed periodically to determine if the network path can support an increased MTU value.

28. A method of determining a maximum transmission unit (MTU) value on a network path between a first node and a second node comprising:
- (a) the second node establishing a Stream Control Transmission Protocol (SCTP) association with the first node;
- (b) the second node receiving one or more Internet Protocol (IP) datagrams from the first node along the network path based on a first MTU value, wherein the one or more IP datagrams store as payload first one or more SCTP packets of the SCTP association;
  - wherein fragmentation of the one or more IP datagrams along the network path is allowed;
  - wherein the second node is the destination of the one or more IP datagrams;
- (c) the second node determining if fragmentation of the one or more IP datagrams along the network path occurred;
- (d) if fragmentation of the one or more IP datagrams occurred, then performing:
  - the second node determining a new MTU value from the first fragment of a particular datagram of the one or more IP datagrams;
  - the second node sending to the first node second one or more SCTP packets over the SCTP association, wherein the second one or more SCTP packets store one or more SCTP chunks which indicate that fragmentation occurred, wherein at least one of the SCTP chunks includes the new MTU value; and
  - repeating steps (b) to (d) one or more times until determining that no fragmentation occurred;

wherein the method is performed by one or more computing devices.

29. A machine-readable tangible non-transitory storage medium storing one or more sequences of instructions for determining a maximum transmission unit (MTU) value on a network path between a first node and a second node, wherein execution of the one or more sequences of instructions by one or more processors causes:
- (a) the second node establishing a Stream Control Transmission Protocol (SCTP) association with the first node;
- (b) the second node receiving one or more Internet Protocol (IP) datagrams from the first node along the network path based on a first MTU value, wherein the one or more IP datagrams store as payload first one or more SCTP packets of the SCTP association;
  - wherein fragmentation of the one or more IP datagrams along the network path is allowed;
  - wherein the second node is the destination of the one or more IP datagrams;
- (c) the second node determining if fragmentation of the one or more IP datagrams along the network path occurred;
- (d) if fragmentation of the one or more IP datagrams occurred, then performing:
  - the second node determining a new MTU value from the first fragment of a particular datagram of the one or more IP datagrams;
  - the second node sending to the first node second one or more SCTP packets over the SCTP association, wherein the second one or more SCTP packets store one or more SCTP chunks which indicate that fragmentation occurred, wherein at least one of the SCTP chunks includes the new MTU value; and
  - repeating steps (b) to (d) one or more times until determining that no fragmentation occurred.

* * * * *